United States Patent
Chi

(10) Patent No.: US 9,911,418 B2
(45) Date of Patent: Mar. 6, 2018

(54) SYSTEMS AND METHODS FOR SPEECH COMMAND PROCESSING

(71) Applicant: Google Inc., Mountain View, CA (US)

(72) Inventor: Liang-Yu (Tom) Chi, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/346,589

(22) Filed: Nov. 8, 2016

(65) Prior Publication Data

US 2017/0053648 A1 Feb. 23, 2017

Related U.S. Application Data

(63) Continuation of application No. 14/444,974, filed on Jul. 28, 2014, now abandoned, which is a
(Continued)

(51) Int. Cl.
*G10L 15/22* (2006.01)
*G06F 17/30* (2006.01)
(Continued)

(52) U.S. Cl.
CPC .......... *G10L 15/22* (2013.01); *G02B 27/017* (2013.01); *G02B 27/0172* (2013.01);
(Continued)

(58) Field of Classification Search
CPC .......... G02B 27/0172; G02B 2027/014; G02B 2027/0178; G02B 27/017;
(Continued)

(56) References Cited

U.S. PATENT DOCUMENTS 5,873,107 A * 2/1999 Borovoy ............... G06F 17/276
707/999.003
6,721,706 B1 4/2004 Strubbe et al.
(Continued)

OTHER PUBLICATIONS

J. Pascoe, "Adding Generic Contextual Capabilities to Wearable Computers", Second International Symposium on Wearable Computers, Oct. 19-20, 1998, p. 92-99, IEEE Press, Pittsburgh, PA.
(Continued)

*Primary Examiner* — Angela A Armstrong
(74) *Attorney, Agent, or Firm* — McDonnell Boehnen Hulbert & Berghoff LLP

(57) ABSTRACT

Methods and apparatus related to processing speech input at a wearable computing device are disclosed. Speech input can be received at the wearable computing device. Speech-related text corresponding to the speech input can be generated. A context can be determined based on database(s) and/or a history of accessed documents. An action can be determined based on an evaluation of at least a portion of the speech-related text and the context. The action can be a command or a search request. If the action is a command, then the wearable computing device can generate output for the command. If the action is a search request, then the wearable computing device can: communicate the search request to a search engine, receive search results from the search engine, and generate output based on the search results. The output can be provided using output component(s) of the wearable computing device.

20 Claims, 11 Drawing Sheets

Related U.S. Application Data continuation of application No. 13/291,320, filed on Nov. 8, 2011, now abandoned.

(60) Provisional application No. 61/507,009, filed on Jul. 12, 2011.

(51) Int. Cl.
| | | |
|---|---|---|
| *G02B 27/01* | (2006.01) | |
| *G06F 1/16* | (2006.01) | |
| *G06F 3/16* | (2006.01) | |
| *G10L 25/48* | (2013.01) | |
| *G06T 11/60* | (2006.01) | |
| *G10L 15/00* | (2013.01) | |

(52) U.S. Cl.
CPC ............. *G06F 1/163* (2013.01); *G06F 3/167* (2013.01); *G06F 17/30401* (2013.01); *G06F 17/30755* (2013.01); *G06F 17/30769* (2013.01); *G06F 17/30864* (2013.01); *G06T 11/60* (2013.01); *G10L 25/48* (2013.01); *G02B 2027/014* (2013.01); *G02B 2027/0178* (2013.01); *G10L 15/00* (2013.01); *G10L 2015/223* (2013.01)

(58) Field of Classification Search
CPC ......... G06F 17/30755; G06F 17/30769; G06F 1/163; G06F 3/167; G06F 17/30401; G06F 17/30864; G06T 11/60; G10L 15/22; G10L 15/30; G10L 15/32; G10L 2015/223; G10L 2015/228; G10L 15/00; G10L 25/48

See application file for complete search history.

(56) References Cited

U.S. PATENT DOCUMENTS

| | | | |
|---|---|---|---|
| 6,862,713 | B1 | 3/2005 | Kraft et al. |
| 7,477,909 | B2 | 1/2009 | Roth |
| 7,499,858 | B2 | 3/2009 | Wolfel |
| 7,584,158 | B2 | 9/2009 | Iwaki et al. |
| 2005/0283532 | A1 | 12/2005 | Kim et al. |
| 2006/0004680 | A1 | 1/2006 | Robarts et al. |
| 2006/0101062 | A1* | 5/2006 | Godman ............... G06F 9/5038 |
| 2007/0033005 | A1* | 2/2007 | Cristo .................. G06F 17/279 704/9 |
| 2008/0071544 | A1 | 3/2008 | Beaufays et al. |
| 2009/0018830 | A1 | 1/2009 | Emmanuel |
| 2009/0327263 | A1 | 12/2009 | Maghoul |
| 2010/0088254 | A1* | 4/2010 | Yang .................... G06N 99/005 706/11 |
| 2010/0245585 | A1 | 9/2010 | Fisher et al. |
| 2011/0043652 | A1 | 2/2011 | King et al. |
| 2011/0098056 | A1 | 4/2011 | Rhoads et al. |

OTHER PUBLICATIONS

E. Teller et al., U.S. Appl. No. 13/019,680, filed Feb. 2, 2011.

* cited by examiner

SYSTEMS AND METHODS FOR SPEECH COMMAND PROCESSING

CROSS REFERENCE TO RELATED APPLICATIONS

This application is a continuation of U.S. patent application Ser. No. 14/444,974, filed Jul. 28, 2014, now pending, which is a continuation of U.S. patent application Ser. No. 13/291,320, filed Nov. 8, 2011, which claims priority to U.S. Provisional Pat. App. No. 61/507,009, filed on Jul. 12, 2011, all of which are fully incorporated herein for all purposes.

BACKGROUND

Unless otherwise indicated herein, the materials described in this section are not prior art to the claims in this application and are not admitted to be prior art by inclusion in this section.

Software applications such as word processing applications can be used to create, edit, and/or view information containing text. For example, word processing software, such as Microsoft Word, can be used to create, edit, and/or view documents that include text.

Additional software applications can be used to convert speech to text. These applications can recognize spoken words and generate corresponding text. Some of these applications can provide a voice interface to other applications, such as voice mail systems.

SUMMARY

In one aspect of the disclosure of the application, speech input is received at a wearable computing device. Speech-related text corresponding to the speech input is generated at the wearable computing device. A context for the speech-related text is determined using the wearable computing device. The context is based at least in part on a history of accessed documents and one or more databases. Based on an evaluation of at least a portion of the speech-related text and the context for the speech-related text, an action is determined. The action includes at least one of a command and a search request. In response to the action including a command, an output based on the command is generated using the wearable computing device. In response to the action including a search request: (i) the search request is communicated to a search engine, (ii) search results are received from the search engine, and an output based on the search results is generated using the wearable computing device. The output is provided using one or more output components of the wearable computing device.

In still another aspect of the disclosure of the application, an apparatus is provided. The apparatus includes: (i) means for receiving speech input, (ii) means for generating speech-related text corresponding to the speech input, (iii) means for determining a context for the speech-related text based at least in part on a history of accessed documents and one or more databases, (iv) means for determining an action based on an evaluation of at least a portion of the speech-related text and the context for the speech-related text, where the action comprises at least one of a command and a search request, (v) means for, in response to the action comprising a command, generating output based on the command, and (vi) means for providing the output.

In yet another aspect of the disclosure of the application, an article of manufacture including a tangible non-transitory computer-readable storage medium having computer-readable instructions encoded thereon is provided. The computer-readable instructions include: (i) instructions for receiving speech input, (ii) instructions for generating speech-related text corresponding to the speech input, (iii) instructions for determining a context for the speech-related text based at least in part on a history of accessed documents and one or more databases, (iv) instructions for determining an action based on an evaluation of at least a portion of the speech-related text and the context for the speech-related text, wherein the action comprises at least one of a command and a search request, (v) instructions for, in response to the action comprising a command, generating output based on the command, (vi) instructions for, in response to the action comprising a search request: (a) communicating the search request to a search engine, (b) receiving search results from the search engine, and (c) generating output based on the search results, and (vi) instructions for providing the output.

DETAILED DESCRIPTION

Overview

Figure 1:
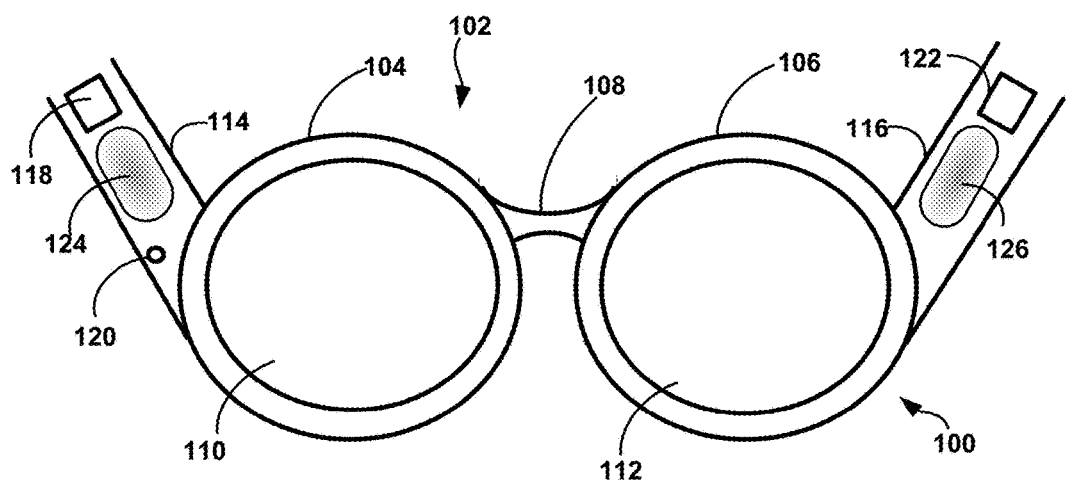
FIG. 1 is a first view of an example system for receiving, transmitting and displaying data, in accordance with example embodiments.

Techniques are described herein for processing speech input using a wearable computing device. For example, a speaker can say "Contact Jim" to provide speech input to the wearable computing device. The speech input can be received via an audio sensor (e.g., a microphone) of the wearable computing device and can be converted to text.

A contextual analysis can be applied on the speech and/or text. For this example, the wearable computing device can convert the speech of "Contact Jim" to text. The contextual analysis of the "Contact Jim" speech can be determined using one or more queries for the text. For example, the word "Contact" can lead to a display of various options for contacting a person; e.g., voice, multimedia, text, e-mail, social networking messages, and other options. Also, a query of contacts or similar information can be performed using the text "Jim" to decide who "Jim" might be. In response to the query, one or more contacts can be returned with the name "Jim."

In some cases, the speaker can provide additional information to contact a person. For example, if no contacts are returned based on the "Jim" query, the speaker could be prompted for information about the contact; e.g., the speaker could be asked for a full name, an e-mail address, or phone number for a contact.

In some cases, the wearable computing device can ask the user to choose between one or more contacts and use the choice to refine the query; e.g., choose between contacts "Jim Alpha" and "Jim Beta" and run a subsequent query based on the chosen contact. Communications options for contacting Jim can be based on the specific contact. For example, suppose the contact is "Jim Beta" and the contact database only includes e-mail contact information for Jim Beta. In this example, the displayed options for contacting Jim Beta may list e-mail only and may not include, for example, contacting Jim Beta via phone or via a social network.

Additionally, contacts can be differentiated by a context that includes recently accessed information such as documents. For example, suppose the user of the wearable computing device had recently been accessing work-related information via the wearable computing device, including some documents written by co-worker Jim Delta. Then, if the user says "Contact Jim", the wearable computing device can use historical information about recently accessed information to determine that the "Jim" in this context could be "Jim Delta" and add "Jim Delta" to a list of contacts when asking the user to differentiate between one or more contacts. In such scenarios, if the user does not have "Jim Delta" as a contact, the wearable computing device could query other devices, such as a work-related server, to determine contact information. The devices to be queried could be selected based on the context; e.g., (domains of) servers that provided recently-accessed information.

In some scenarios, additional or different context signals can be utilized. For example, a user of the wearable computing device might say "Show Map to Last Saturday's Restaurant." The wearable computing device can convert this speech to text. Then, based on the converted text, the wearable computing device can generate the desired map, perhaps by looking up information about the activities of the user on "Last Saturday" in one or more calendar data bases, e-mails, and/or other data sources to find one or more restaurants associated with the user on last Saturday. If multiple restaurants are found, the user can be prompted (visually and/or audibly) to select one of the restaurants. Once a restaurant is determined, a map to the restaurant can be displayed via the wearable computing device. Other related information, such as pictures of the restaurant, menus, diner reviews, turn-by-turn directions to get to the restaurant, information about friends/contacts at or near the restaurant, related establishments, etc. can be provided to the user of the wearable computing device as well.

System and Device Architecture

FIG. 1 illustrates an example system 100 for receiving, transmitting, and displaying data. The system 100 is shown in the form of a wearable computing device. While FIG. 1 illustrates eyeglasses 102 as an example of a wearable computing device, other types of wearable computing devices could additionally or alternatively be used.

As illustrated in FIG. 1, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed. Each of the lens elements 110 and 112 may also be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, the system 100 may be connected to or be integral to a head-mounted helmet structure. Other possibilities exist as well.

The system 100 may also include an on-board computing system 118, a video camera 120, a sensor 122, and finger-operable touch pads 124, 126. The on-board computing system 118 is shown to be positioned on the extending side-arm 114 of the eyeglasses 102; however, the on-board computing system 118 may be provided on other parts of the eyeglasses 102. The on-board computing system 118 may include a processor and memory, for example. The on-board computing system 118 may be configured to receive and analyze data from the video camera 120 and the finger-operable touch pads 124, 126 (and possibly from other sensory devices, user interfaces, or both) and generate images for output to the lens elements 110 and 112.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Many video cameras with a small form-factor, such as those used in cell phones or webcams, for example, may be incorporated into an example of the system 100. Although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown mounted on the extending side-arm 116 of the eyeglasses 102; however, the sensor 122 may be provided on other parts of the eyeglasses 102. The sensor 122 may include one or more motion sensors, such as a gyroscope and/or an accelerometer. Other sensing devices may be included within the sensor 122 and other sensing functions may be performed by the sensor 122.

The finger-operable touch pads 124, 126 are shown mounted on the extending side-arms 114, 116 of the eyeglasses 102. Each of finger-operable touch pads 124, 126 may be used by a user to input commands. The finger-operable touch pads 124, 126 may sense at least one of a position and a movement of a finger via capacitive sensing, resistance sensing, or a surface acoustic wave process, among other possibilities. The finger-operable touch pads 124, 126 may be capable of sensing finger movement in a direction parallel to the pad surface, in a direction normal to the pad surface, or both, and may also be capable of sensing a level of pressure applied. The finger-operable touch pads 124, 126 may be formed of one or more translucent or transparent insulating layers and one or more translucent or transparent conducting layers. Edges of the finger-operable touch pads 124, 126 may be formed to have a raised, indented, or roughened surface, so as to provide tactile feedback to a user when the user's finger reaches the edge of the finger-operable touch pads 124, 126. Each of the finger-operable touch pads 124, 126 may be operated independently, and may provide a different function.

Figure 2:
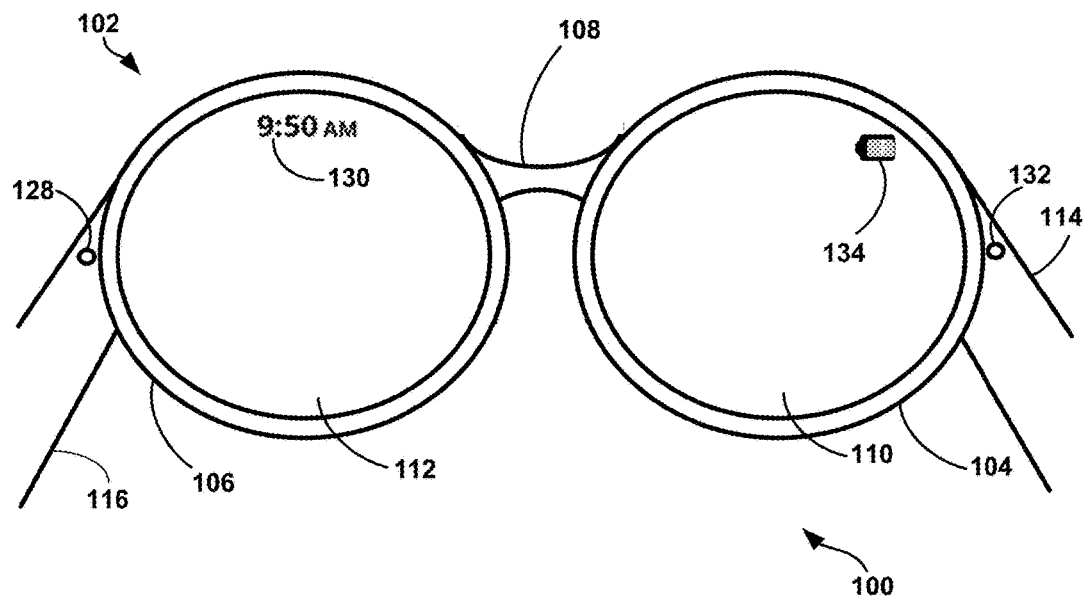
FIG. 2 is a second view of an example system of FIG. 1, in accordance with example embodiments.

FIG. 2 illustrates another view of the system 100 of FIG. 1. As shown in FIG. 2, the lens elements 110 and 112 may act as display elements. The eyeglasses 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110 and 112 may act as a combiner in a light projection system and may include a coating that reflects the light projected onto them from the projectors 128 and 132. In some embodiments, a special coating may not be used (e.g., when the projectors 128 and 132 are scanning laser devices).

In alternative embodiments, other types of display elements may also be used. For example, the lens elements 110, 112 themselves may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

In other embodiments (not shown in FIGS. 1 and 2), system 100 can be configured for audio output. For example, system 100 can be equipped with speaker(s), earphone(s), and/or earphone jack(s). In these embodiments, audio output can be provided via the speaker(s), earphone(s), and/or earphone jack(s). Other possibilities exist as well.

Figure 3:
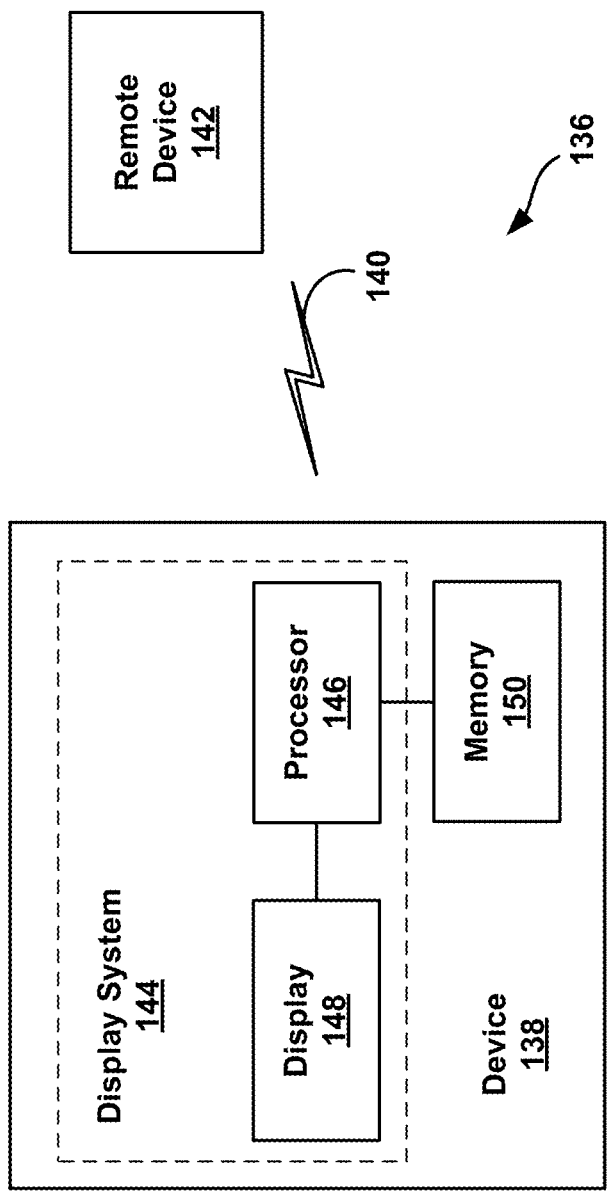
FIG. 3 is an example schematic drawing of computer network infrastructure, in accordance with an example embodiment.

FIG. 3 is a schematic drawing of a system 136 illustrating an example computer network infrastructure. In system 136, a device 138 communicates using a communication link 140 (e.g., a wired or wireless connection) to a remote device 142. The device 138 may be any type of device that can receive data and display information corresponding to or associated with the data. For example, the device 138 may be a heads-up display system, such as the eyeglasses 102 described with reference to FIGS. 1 and 2.

Thus, the device 138 may include a display system 144 comprising a processor 146 and a display 148. The display 148 may be, for example, an optical see-through display, an optical see-around display, or a video see-through display. The processor 146 may receive data from the remote device 142, and configure the data for display on the display 148. The processor 146 may be any type of processor, such as a micro-processor or a digital signal processor, for example.

The device 138 may further include on-board data storage, such as memory 150 shown coupled to the processor 146 in FIG. 3. The memory 150 may store software and/or data that can be accessed and executed by the processor 146, for example.

The remote device 142 may be any type of computing device or transmitter including a laptop computer, a mobile telephone, etc., that is configured to transmit data to the device 138. The remote device 142 and the device 138 may contain hardware to enable the communication link 140, such as processors, transmitters, receivers, antennas, etc.

In FIG. 3, the communication link 140 is illustrated as a wireless connection. The wireless connection could use, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Alternatively or additionally, wired connections may be used. For example, the communication link 140 may be a wired link via a serial bus such as a universal serial bus or a parallel bus. A wired connection may be a proprietary connection as well. The communication link 140 may also be a combination of wired and wireless connections. The remote device 142 may be accessible via the Internet and may comprise a computing cluster associated with a particular web service (e.g., social-networking, photo sharing, address book, etc.).

Example Wearable Computing System

Figure 4:
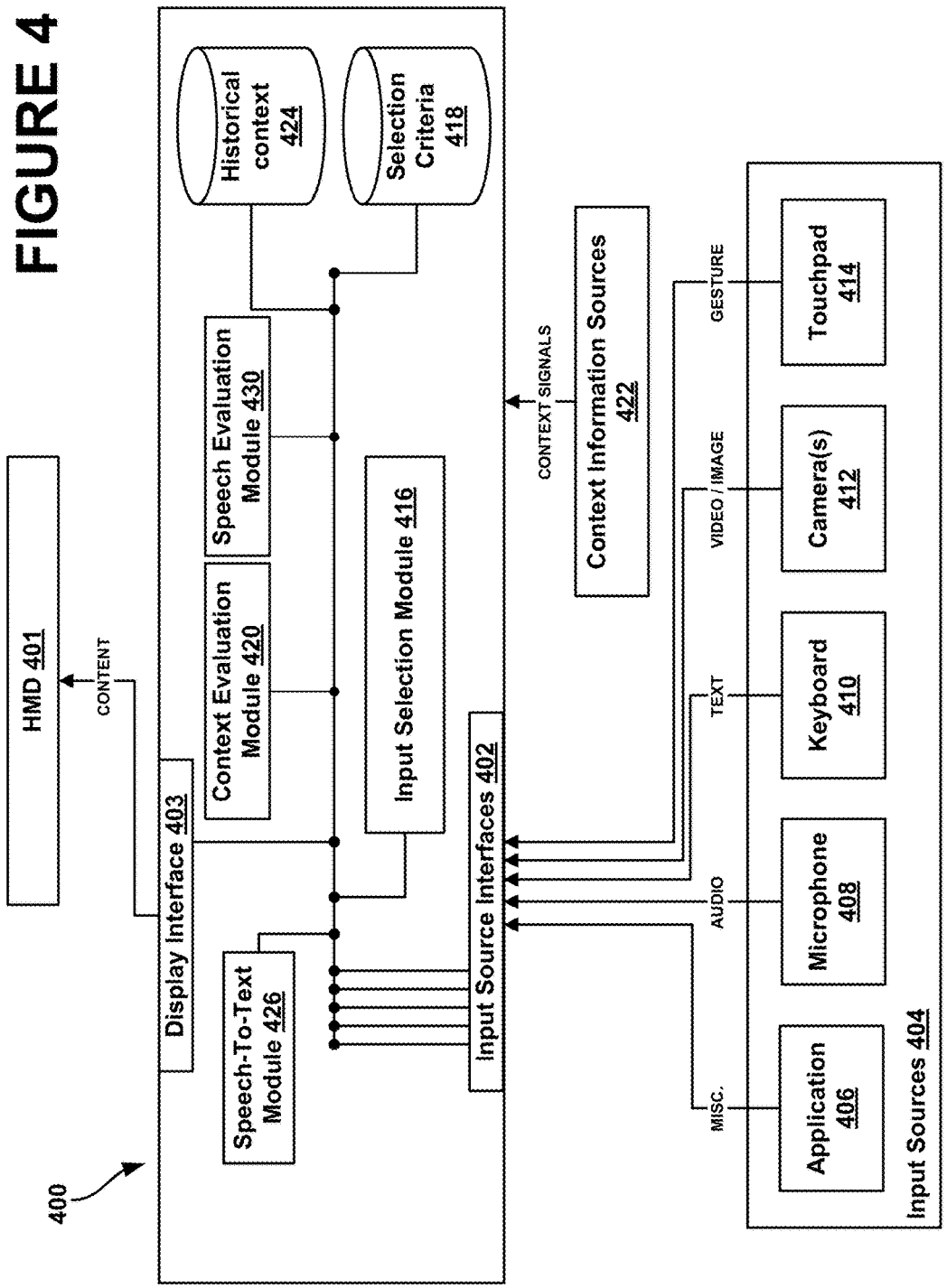
FIG. 4 is a functional block diagram for a wearable computing system, in accordance with an example embodiment.

FIG. 4 is a functional block diagram for a wearable computing system 400 in accordance with an example embodiment. System 400 is configured to monitor incoming data from a number of input sources 404. For example, system 400 can monitor speech received via microphone 408 and, may convert the speech to text using speech-to-text module 426. The input speech can include instructions that specify actions and objects for the actions. Accordingly, system 400 can be configured to detect instructions, and to responsively initiate the actions specified in the instructions.

Example Input Sources

As shown in FIG. 4, system 400 includes one or more input-source interfaces 402 for receiving data from input sources 404. In the illustrated embodiment, the input sources 404 include, for example, an application 406, a microphone 408, a keyboard 410, a camera 412, and a touchpad 414. A given input-source interface 402 may be configured to interface with and receive data from a single input source, such as microphone 408. Alternatively, a given input-source interface 402 may be configured to simultaneously interface with multiple input sources, such as input sources 406-414.

System 400 can receive a number of different modalities of input data from input sources 404. In the illustrated embodiment, system 400 may receive, for example, audio data from microphone 408, text data from keypad 410, video data and/or image data from camera(s) 412, and/or gesture data from touchpad 414. A system may be configured to receive other modalities of data, in addition or in the alternative to those described, without departing from the scope of the invention.

Selection Criteria for Input Content

In the illustrated embodiment, system 400 includes an input selection module 416, which generally functions to evaluate the input data from the various input sources 404.

In particular, input selection module 416 may be configured to receive input data from the input sources 404 via input source interfaces 402 and detect one or more data patterns in the input data.

In some cases, input selection module 416 may detect multiple concurrent data patterns in the input data. For example, input selection module 416 may detect a first data pattern in data from a first source and, simultaneously, detect a second data pattern in data from a second source. As such, selection criteria 418 may provide input-selection rules that prioritize certain data patterns and/or certain input sources.

For instance, selection criteria 418 may prioritize detection of speech in audio data from microphone 408 over other data patterns detected in video data from camera 412. Accordingly, some embodiments may be configured to display a text conversion of speech whenever speech matching a data pattern is detected in incoming audio data, regardless of whether there is also a matching data pattern in incoming video data. Similarly, if input selection module 416 detects that a user is entering text via a keyboard 410, this text may be displayed, even when there is a matching data pattern in incoming audio data and/or in incoming video data; for example, where keyboard data is given priority over audio data and video data by selection criteria 418.

In a further aspect, selection criteria 418 may provide input-selection rules that prioritize certain data patterns when multiple matching data patterns are detected from a common input source. For instance, when explicit commands are received in audio data, the explicit commands may be given priority over implicit information in the audio data from input sources 404. As one specific example, input-selection criteria 418 may specify that when a user says "show video" (e.g., when "show video" is detected in audio data from microphone 408), then this should be interpreted as an explicit command to select camera 412 as the input source and display video from camera 412.

It should be understood selection criteria 418 may specify other hierarchies and/or other prioritizations of input sources and/or data patterns, without departing from the scope of the invention. Thus, selection criteria 418 may be based on one or more objectives in a specific implementation.

In a further aspect, there may be scenarios where the selection criteria 418 indicate that multiple input sources 404 should be selected. For example, a scenario may exist where text is detected in input data from keyboard 410 and speech is detected in audio data from microphone 408. In this scenario, speech-to-text module 426 may convert the speech from the audio data to text, and this text may be merged with the text from the keyboard for display. As another example, scenarios may exist where video or an image from camera 412 is displayed, and text is overlaid on top of the video or image. In such a scenario, the text may be obtained from the keyboard 410 and/or obtained via speech-to-text module 426 converting speech in audio data from microphone 408. Many other examples combinations of multiple input sources, which combine a variable number of input sources, are also possible.

In another aspect, the selection criteria 418 can indicate that speech is to be evaluated by speech evaluation module 430. Speech evaluation module 430 can be configured to receive speech and/or text as input, evaluate the input, and responsively generate one or more commands. For example, speech input "Display map" can be received at microphone 408, passed through input source interface 402, and received at input selection module 416. Selection criteria 418 can direct input selection module 416 to: (1) convert the spoken input to corresponding text via speech-to-text module 426 and (2) provide the corresponding text to speech evaluation module 430 for evaluation.

In some embodiments, part or all of the functionality of one or more of the herein-described modules 416, 420, 426, 430, selection criteria 418, and historical context 424 can be combined with one or more other modules. For example, the part or all of the functionality of speech evaluation module 430 can be combined with input selection module 416 or speech-to-text-module 426.

Speech evaluation module 430 can evaluate the text of "Display map" to determine that the text includes an action or command of "Display" and an object of "map." Based on the evaluation, speech evaluation module 430 can send a command to generate a map; e.g., send a query to a server to provide a map. Upon receiving the map, speech evaluation module 430 can then send a command to Head Mounted Display (HMD) 401 to display the received map. Many other examples are possible as well.

In embodiments not depicted in FIG. 4, output can be provided to other devices than HMD 401; for example, output can be communicated via communication link 140. As another example, if system 400 is equipped with speaker (s), earphone(s), and/or earphone jack(s), audio output can be provided via the speaker(s), earphone(s), and/or earphone jack(s). Other outputs are possible as well.

Selection of Input Content Based on Implicit Information

System 400 can select an input based on implicit information extracted from input data from the various possible input sources. This implicit information may correspond to certain data patterns in the input data.

When system 400 includes a microphone or other audio sensor as an input source, input selection module 416 may monitor incoming audio data for various data patterns, according to the input-selection criteria. The input-selection criteria may specify numerous types of data patterns, which may vary in complexity and/or form.

For example, input selection module 416 may monitor audio data for: (i) patterns that are indicative of human speech in general, (ii) patterns that are indicative of human speech by a particular person (e.g., the owner of the device, or a friend or spouse of the owner), (iii) patterns that are indicative of a certain type of human speech (e.g., a question or a proposition), (iv) patterns that are indicative of human speech inflected with a certain emotion (e.g., angry speech, happy speech, sad speech, and so on), (v) patterns that are indicative of human speech associated with a certain context (e.g., a pre-recorded announcement on a subway car or a statement typically given by a flight attendant on an airplane), (vi) patterns that are indicative of a certain type of human speech (e.g., speech that is not in a speaker's native language), (vii) patterns indicative of certain types of non-speech audio (e.g., music) and/or of non-speech audio with certain characteristics (e.g., a particular genre of music), and/or (viii) other types of audio-data patterns.

As a specific example, a system may be configured to monitor audio data for data patterns that include or are indicative of speech by a particular user, who is associated with the system (e.g., the owner of a wearable computer). Accordingly, the speech-to-text module 426 may convert the speech to corresponding text, which may then be displayed.

In some embodiments, the audio data in which speech is detected may be analyzed in order to verify that the speech is actually that of the user associated with the system. For example, the audio data can be compared to previously-received samples of audio data known to be utterances of the user associated with the system to verify that a speaker is (or is not) the user associated with the system. In particular embodiments, a "voiceprint" or template of the voice of the user associated with the system can be generated, and compared to a voiceprint generated from input audio data. Other techniques for verifying speaker(s) are possible as well.

Further, when speech is detected, and possibly in other scenarios as well, the detected speech may be analyzed for information that may imply certain content might be desirable. For instance, when a speaker says a person's name, speech evaluation module 430 can generate command(s) to search various sources for the named person's contact information or other information related to the named person. Speech evaluation module 430 may perform one or more implicit searches, for example, when the person's name is stated in the midst of a conversation, and the user does not explicitly request the information about the person. Implicit searches can be performed for other types of content, such as other proper nouns, repeated words, unusual words, and/or other words.

If contact information for the named person is located, speech evaluation module 430 can indicate that the contact information may be displayed. For example, the contact information can include phone number(s), email address(es), mailing address(es), images/video related to the contact, and/or social networking information. Furthermore, the contact information may be displayed in various forms—the contact information can be displayed visually (e.g., using HMD 401) and/or audibly (e.g., using a text-to-speech module, not shown in FIG. 4, in combination with an audio output, such as a speaker or earphone not shown in FIG. 4). Many other types of contact information are possible as well.

In the event that analysis of the speech does not provide implicit information that can be used to select an input source, text corresponding to the detected speech can be displayed. Alternatively, the default action may be not to display anything related to the detected speech. Other default actions are also possible.

Selection of Content Based on Context Information

In a further aspect, input selection module 416 may be configured to select an input source and/or to select input content based on context. In order to use context information in the selection process, input selection module 416 may coordinate with context evaluation module 420, which is configured to evaluate context signals from one or more context information sources 422. For example, context evaluation module 420 may determine a context, and then relay the determined context to input selection module 416. In some cases, input selection module 416 can provide the context to another module; e.g., speech evaluation module 430.

In an example embodiment, context evaluation module 420 may determine context using various "context signals," which may be any signals or information pertaining to the state or the environment surrounding the system or a user associated with the system. As such, a wearable computer may be configured to receive one or more context signals, such as location signals, time signals, environmental signals, and so on. These context signals may be received from, or derived from information received from, context information sources 422 and/or other sources.

Many types of information, from many different sources, may serve as context signals or provide information from which context signals may be derived. For example, context signals may include: (a) the current time, (b) the current date, (c) the current day of the week, (d) the current month, (e) the current season, (f) a time of a future event, (g) a date of a future event or future user-context, (h) a day of the week of a future event or future user-context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on user's calendar, information available via a user's social networking account, and/or other context signals or sources of context information, (z) health statistics or characterizations of a user's current health (e.g., whether a user has a fever or whether a user just woke up from being asleep), (aa) items a user has indicated a need for in the past or has gone back to get in the recent past, (bb) items a user currently has (e.g., having a beach towel makes it more likely that a user should also have sunscreen), and (cc) a user's recent context as determined from sensors on or near the user and/or other sources of context information. Those skilled in the art will understand that the above list of possible context signals and sources of context information is not intended to be limiting, and that other context signals and/or sources of context information are possible in addition, or in the alternative, to those listed above.

In some embodiments, context evaluation module 420 may identify the context as a quantitative or qualitative value of one context signal (e.g., the time of the day, a current location, a user status). The context may also be determined based on a plurality of context signals (e.g., the time of day, the day of the week, and the location of the user). In other embodiments, the context evaluation module 420 may extrapolate from the information provided by context signals. For example, a determined user-context may be determined, in part, based on context signals that are provided by a user (e.g., a label for a location such as "work" or "home", or user-provided status information such as "on vacation").

In a further aspect, context information sources 422 may include various sensors that provide context information. These sensors may be included as part of or communicatively coupled to system 400. Examples of such sensors include, but are not limited to, a temperature sensor, an accelerometer, a gyroscope, a compass, a barometer, a moisture sensor, one or more electrodes, a shock sensor, one or more chemical sample and/or analysis systems, one or more biological sensors, an ambient light sensor, a microphone, and/or a digital camera, among others.

System 400 may also be configured to acquire context signals from various data sources. For example, context evaluation module 420 can be configured to derive information from network-based weather-report feeds, news feeds and/or financial-market feeds, a system clock providing a reference for time-based context signals, and/or a location-determining system (e.g., GPS), among others.

In another aspect, system 400 may also be configured to learn over time about a user's preferences in certain contexts, and to update selection criteria 418 accordingly. For example, whenever an explicit input-content instruction is received, a corresponding entry may be created in historical context database 424. This entry may include the input source and/or input content indicated by the input-content instruction, as well as context information that is available at or near the receipt of the input-content instruction. Context evaluation module 420 may periodically evaluate historical context database 424 and determine a correlation exists between explicit instructions to select a certain input source and/or certain input content, and a certain context. When such a correlation exists, selection criteria 418 may be updated to specify that the input source should be automatically selected, and/or that the input content should be automatically displayed, upon detection of the corresponding context.

Additionally or alternatively, system 400 may be configured for an "on-the-fly" determination of whether a current context has historically been associated with certain input sources and/or certain input content. In particular, context evaluation module 420 may compare a current context to historical context data in historical context database 424, and determine whether certain content historically has been correlated with the current context. If a correlation is found, then context evaluation module 420 may automatically display the associated input content.

For example, suppose a user of system 400 typically orders lunch from one of seven restaurants between 12:00 and 12:30 while at work. Then, context evaluation module 420 can determine that the context include (a) a location of system 400 is related to "work" (b) a time just before or at 12:00, (c) a history of ordering lunch from the aforementioned seven restaurants, and (c) that six of the seven restaurants are open at this time, based on online listings. Then, the context evaluation module 420 can generate a command to display a reminder to "Order Lunch" with a list of the six open restaurants for order selection, and perhaps including information indicating that the seventh restaurant is closed. In response, the user can select a restaurant from the list using input sources 404, choose another restaurant, dismiss/postpone the order, or perhaps, perform some other action.

As another example, when speech evaluation module 430 detects an "open" speech action followed by a file name, speech evaluation module 430 may select the particular application that is appropriate to open the file as the input source, launch the selected application in the multimode input field, and then open the named file using the application. As an additional example, the user may say "search" and then state or type the terms to be searched, or identify other content to be searched, such as an image, for example. When speech evaluation module 430 detects such a "search" action, it may responsively form a query to a search engine, provide the query with subsequently stated terms or identified content, and receive search results in response to the query. Implicit searches also can be performed by this technique of forming a query based on identified content; e.g., the word(s) that provoked the implicit search, providing the query with identified content to a search engine, and receiving search results in response to the query.

As the above examples illustrate, speech actions may include objects that directly identify the input source or sources to select (e.g., a "select video" instruction), or may identify an input source by specifying an action that involves the input source (e.g., a "contact information" or "search" action). Many other actions of speech input can identify an input source.

Historical context database 424 can also, or instead, include information about a document context that can be included a context. A document context may involve context information derived from a given document within a collection of documents, such as, but not limited to, related collections of documents and past documents that have been created by the user and/or by other users. For example, based on the fact that a user has created a number of purchase order documents in the past, a background process may interpret the document in the context of a purchase order agreement, perhaps searching for supplier names and/or supplier part numbers upon which a search requests can be based.

A document can be a bounded physical or digital representation of a body of information, or content. Content of the document can include text, images, video, audio, multimedia content, and/or other types of content. Document-property information can be associated with a document, such as, but not limited to, document names, sizes, locations, references, partial or complete content of documents, criteria for selecting documents to form a context and/or to locate a document. Other types of content and document-property information are possible as well.

In some cases, a document can be accessed via one or more references such as, but not limited to, a Uniform Resource Locator (URL), a Uniform Resource Identifier (URI), a volume name/number, a title, a page number, an address, a storage address, such as a memory address or disk sector, a library index number, an International Standard Book Number (ISBN), a bar code, and/or other identifying information. Other document references are possible as well.

In addition to speech commands, system 400 may allow a user to provide explicit instructions via other input sources, such as keyboard 410 and/or touchpad 414. Like explicit speech commands, explicit instructions received via other input sources 404 may include input-content instructions to select a certain input source and/or to display certain content, as well explicit instructions to perform other actions.

Example Scenarios for Speech Evaluation and Related Actions

Figure 5A:
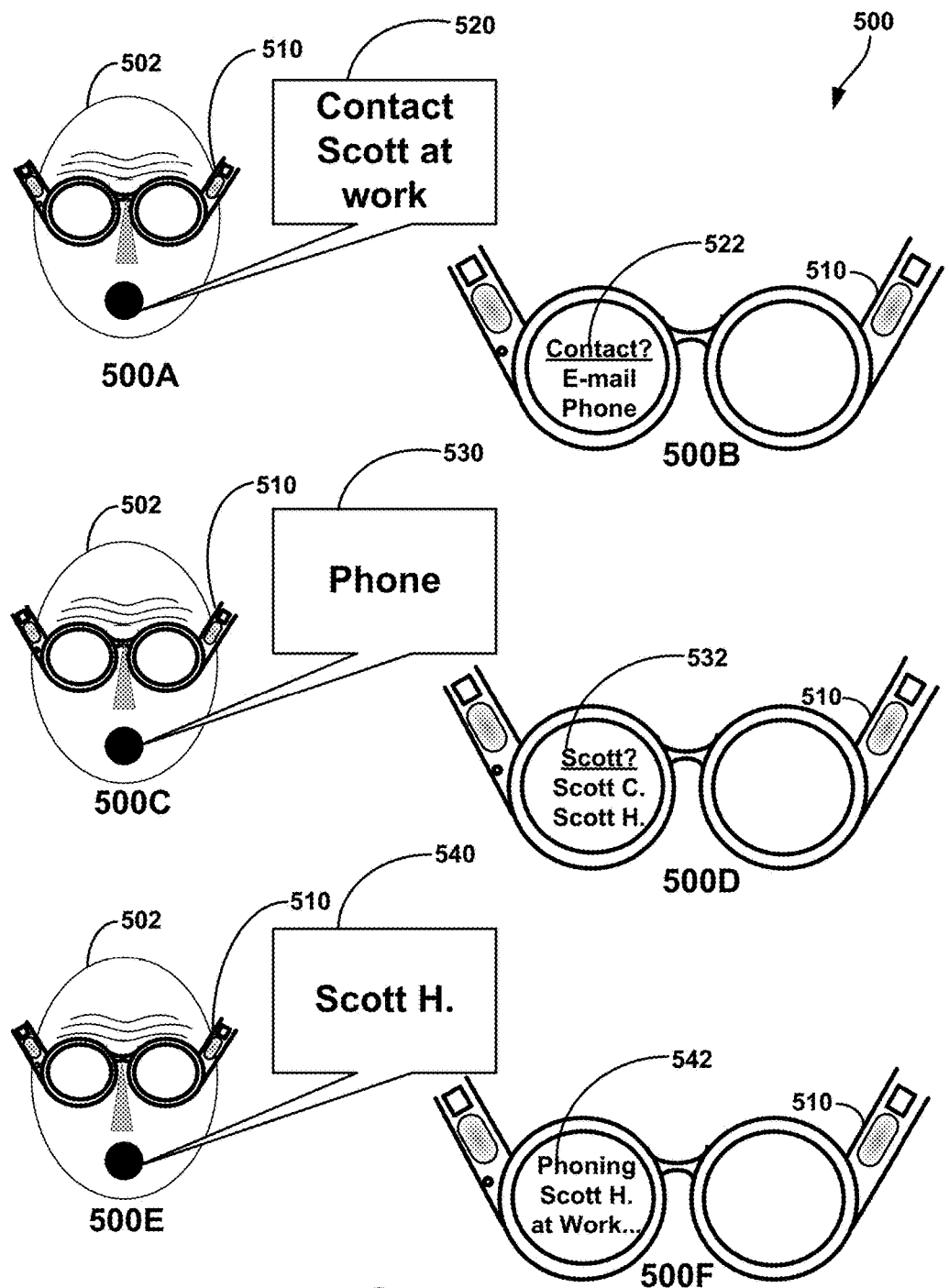
FIG. 5A depicts a first scenario of speech evaluation in accordance with an example embodiment.

FIG. 5A depicts a scenario 500 of speech evaluation in accordance with an example embodiment. Scenarios 500, 600, 700, 800, and 900 below each involve speaker 502 utilizing wearable computing device 510. An example wearable computing device that could be utilized as device 510 is system 400, described in detail above with reference to FIG. 4.

As discussed below, device 510 can be configured to process an utterance to determine whether or not the utterance is a speech command. A speech command can have one or more actions and zero or more objects for each action. For example, the speech command "Shutdown" without an object can be interpreted by device 510 to power itself off. As another example, the speech command "Shutdown earphones and speakers" can be interpreted by device 510 to stop output from and/or power down earphone(s) and speaker(s) associated with device 510. Many other examples of speech commands, actions, and objects beyond those described herein are possible as well.

In some embodiments, the order of actions and objects in a speech command can be reversed or otherwise reordered. For example, speech commands in German and other languages typically have object(s) preceding actions. As another example, the device can understand the utterance "Mom phone" to be a speech command to call Mom, perhaps from a very young English-speaking user.

Scenario 500 begins at 500A with speaker 502 instructing device 510 to "Contact Scott at work" via utterance 520. At 500B, upon processing part of utterance 520, device 510 prompts speaker 502 to disambiguate the action "contact" with prompt 522. As shown in FIG. 5, prompt 522 includes a question "Contact?" and two options "E-mail" and "Phone." In other scenarios, prompt 522 can include more than two options to disambiguate an action.

At 500C, speaker 502 disambiguates the action "contact" via utterance 530 of "Phone." Upon further processing of utterances 520 and 530, device 510 prompts speaker 502 at 500D to disambiguate Scott using prompt 532. FIG. 5 shows that prompt 532 includes a question "Scott?" and two options "Scott C." and "Scott H."

At 500E, speaker 502 responds to prompt 532 with utterance 540 of "Scott H." Upon further processing of utterances 520, 530, and 540, device 510 places a phone call to Scott H. at work, and generates prompt 542 informing speaker 502 that device 510 is "Phoning Scott H. at Work . . ."

Figure 5B:
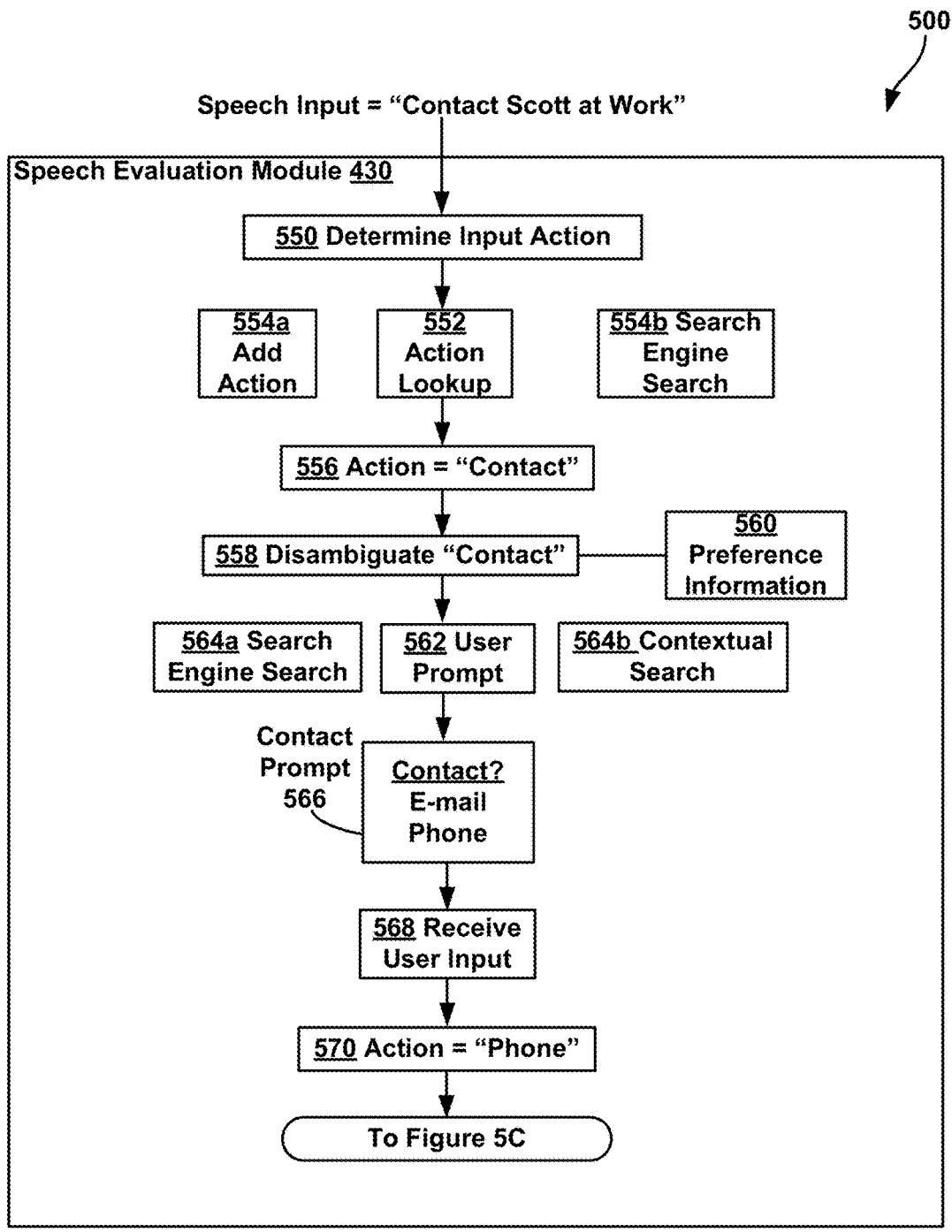
FIGS. 5B and 5C depict processing by a speech evaluation module for the speech uttered in the scenario of FIG. 5A in accordance with an example embodiment.
Figure 5C:
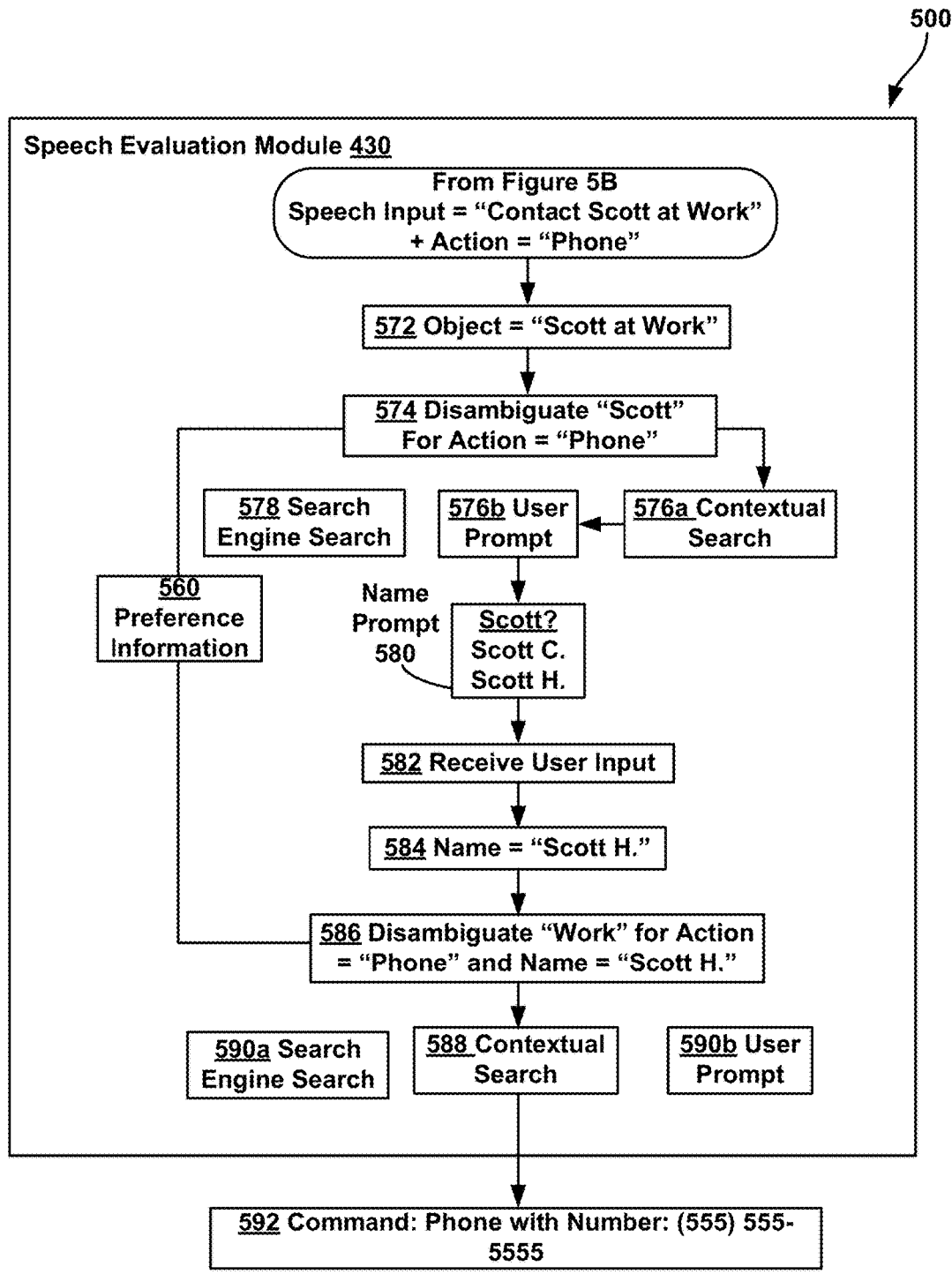

FIGS. 5B and 5C depict processing by speech evaluation module 430 for speech uttered in scenario 500 in accordance with an example embodiment. Speech evaluation module 430 is configured to receive speech input in either audible or textual form. FIG. 5B shows the speech input of "Contact Scott at Work" in textual form. In scenarios not shown in FIG. 5B, speech input received in audible form is converted to text and then processed as described herein. For example, speech evaluation module can provide speech input in audible form to speech-to-text module 426 for conversion to textual form, and then process the converted audible-form speech input.

At block 550, speech evaluation module 430 determines an input action for the speech input. FIG. 5B shows that speech evaluation module 430 determines the input action by performing action lookup 552, and also shows that techniques for add action 554a and search engine search 554b can be utilized along with, or instead of, performing action lookup 552.

Action lookup 552 can divide speech input into words and compare each word with one or more known action words. For example, the known action words can be stored, searched, and retrieved using a list, table, tree, trie, dictionary, database, and/or other data structure(s) configured to store at least one action word. Then, action lookup 552 can find word(s) in the speech input that are known action words by looking up the each input word in the data structure(s) storing the known action words.

Example action words include, but are not limited, to words related to control of device 510 (e.g., turn on or off, louder, softer, increase, decrease, mute, output, clear, erase, brighten, darken, etc.), document processing (e.g., open, load, close, edit, save, undo, replace, delete, insert, format, etc.), communications (e.g., e-mail, mail, call, contact, send, receive, get, post, tweet, text, etc.), searches (e.g., find, search, look for, locate, etc.), content delivery (e.g., show, play, display), and other action words. Many other example action words are possible as well.

In scenario 500, action lookup 552 can identify the word "contact" as an action word. In some embodiments, the word contact can be further identified as a "communication action" or action word related to communications, such as indicated in the paragraph above. Block 556 of FIG. 5B shows that speech evaluation module 430 has identified an action of "contact" in the speech input.

At block 558, speech evaluation module 530 can "disambiguate" the word "contact." Disambiguation involves determining a (more) precise meaning for one or more words in speech input. For example, while "contact" is a communication action, multiple techniques can be used to contact a person utilizing device 510. For example, device 510 can be used to contact a person and/or device via telephone, e-mail, text message, blog entry, tweet, and/or other communications techniques.

Disambiguation can involve preference information 560. Preference information 560 can include preferences for techniques for use in contacting others (e.g., always call Alice, always tweet Bob, call Carol only between 10 AM and 10 PM, only contact Dan when at work or at home), information about contact lists and other contextual information, calendar information, information about previous speech commands, information about disambiguating action words, and/or other information.

For example, preference information 560 can indicate that speaker 502 prefers to use phone calls and e-mail to "contact" others. Since preference information 560 indicates that two or more possible actions can be performed, speech evaluation module 430 can determine that user prompt 562 can disambiguate the action of contacting between telephoning and e-mailing. FIG. 5B shows that techniques of search engine search 564a and/or contextual search 564b can be utilized along with, or instead of, performing user prompt 562.

Contact prompt 566 shown in FIG. 5B is the same as prompt 522 of FIG. 5A. After providing contact prompt 566, speech evaluation module 430 can await user input at block 568. In scenario 500, the user input is "phone" as shown as utterance 530 of FIG. 5B and in block 570 of FIG. 5C, where the action is determined to be phone. In some embodiments, an action identifier and/or other information about the phone action can be maintained as well by speech evaluation module 430.

Now turning to FIG. 5C, where the speech input is "Contact Scott at Work" and the action has been determined to be "phone." At block 572, speech evaluation module 430 can remove the word disambiguated "contact" from the input, and process the remaining input of "Scott at Work" as an object for the phone action.

At block 574, speech evaluation module 430 disambiguates the word "Scott" for the phone action. FIG. 5C shows that speech evaluation module 430 can disambiguate the word Scott using contextual search 576a and user prompt 576b, and also shows that search engine search 578 can be utilized along with, or instead of, contextual search 576a and user prompt 576b.

Contextual search 576a involves searching historical context database 424 and perhaps other contextual information. The contextual search can be performed by speech evaluation module 430 and/or content evaluation module 420 (shown in FIG. 4). As discussed above with reference to FIG. 4, historical context database 424 can include entries regarding input sources and content, such as documents, web pages, URLs, URIs, computer addresses such as Internet Protocol (IP) addresses, images, video files, audio files, and/or other files accessed by device 510. In some embodiments, historical context database 424 can store and/or retrieve context signals as well, such as a current time and/or location when an input source is accessed.

Alternatively or additionally, other contextual information can be searched as well as part of a contextual search. The other contextual information can include information about a speaker 502, such as identification information of speaker 502, contacts/friends of speaker 502, a calendar of events for the speaker 502, organizations related to speaker 502, and other information related to speaker 502. The other context information can include information about other entities other than speaker 502 such as members of the speaker 502's family, work colleagues, mailing lists, blogs, feeds, organization(s), persons with shared interests, and/or other related entities.

Based on contextual search 576a, speech evaluation module 430 can determine that there are two persons named Scott that speaker 502 may be trying to contact: Scott C. or Scott H. To disambiguate between Scott C. and Scott H., speech evaluation module 430 can use user prompt technique 576b to provide name prompt 580.

FIG. 5C shows that name prompt 580 is the same as prompt 532 of FIG. 5B. After providing name prompt 580, speech evaluation module 430 can await user input at block 582. In scenario 500, the user input is "Scott H." as shown as utterance 540 of FIG. 5B and in block 584 of FIG. 5C, where Name is determined to be "Scott H." In some embodiments, an identifier and/or other information about name and/or Scott H. can be maintained as well by speech evaluation module 430.

At block 586, speech evaluation module 430 can remove the word "Scott" from the input, as already disambiguated, and process the remaining input of "at Work" as part of the object whose name is "Scott H." At block 588, speech evaluation module 430 can perform a contextual search for a phone number for "Scott H." that is "at work", and determine a phone number for Scott H. at work. For example, speech evaluation module 430 can search for "Scott H" in a contact database, list of most recently accessed documents, work-related computer, and/or other resources to find a telephone number for Scott H. at work. In this example, Scott H.'s work number is (555) 555-5555. FIG. 5C also indicates that speech evaluation module 430 can also or instead perform search engine search 590a and/or user prompt 590b to determine the phone number.

Upon determining that phone number (555) 555-5555 is a number for Scott H. at work, speech evaluation module 430 can output a command to phone the number (555) 555-5555 in response to the speech input of "Contact Scott at Work." Upon receiving this command, device 510 can utilize telephone-related hardware and/or software to place a call to telephone number (555) 555-5555 on behalf of speaker 502, process the call, and tear down the call when the call ends.

Figure 6:
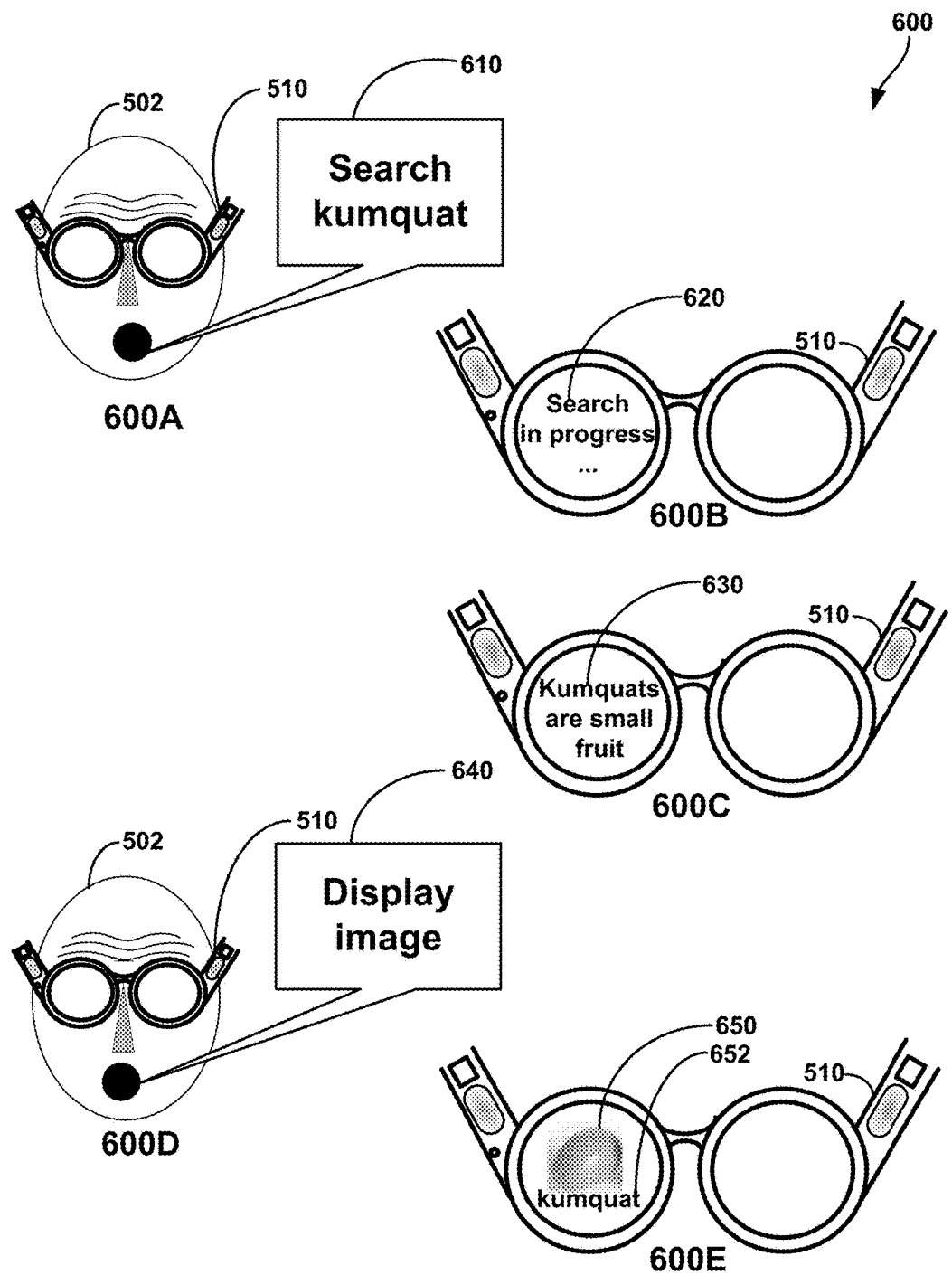
FIG. 6 depicts a second scenario of speech evaluation in accordance with an example embodiment.

FIG. 6 depicts a scenario 600 of speech evaluation in accordance with an example embodiment. Scenario 600 begins at 600A with speaker 502 instructing device 510 using utterance 610 of "Search kumquat."

Upon receiving utterance 610, speech evaluation module 430 of device 510 can determine that the action is "search" and the object is "kumquat" using the techniques discussed above with reference to FIGS. 5B and 5C. Upon determining that the action is "search", speech evaluation module 430 can send a command to utilize a search engine to search for the object kumquat, and also display a user prompt that the search is in progress.

At 600B, FIG. 6 shows that device 510 shows prompt 620 of "Search in progress . . . " to show the search is in progress. At 600C, FIG. 6 shows a search result 630 of "Kumquats are small fruit" displayed using device 510. Search result 630 can be part or all of information returned by the search engine responding to the command to utilize the search engine for the object kumquat.

At 600D, FIG. 6 shows that scenario 600 continues by speaker 502 providing utterance "Display image" 640 to device 510. Upon receiving the speech input of "Display image", speech evaluation module 430 can determine that utterance 640 has an action of "display" and an object of "image" using the techniques discussed above with reference to FIGS. 5B and 5C. Device 510 can disambiguate the object "image" using the context of the previous command, where the object was "kumquat", to determine that speech input is a command to display an image of a kumquat.

Then, speech evaluation module 430 can perform another search (or perhaps process results of the already-performed search) to find an image related to the object "kumquat." For example, speech evaluation module 430 can search for images and/or video using the keyword kumquat. In response, a search engine or other entity can provide device 510 an image related to a kumquat.

At 600E, FIG. 6 shows a display of kumquat image 650 and text 652 of "kumquat" displayed in response to utterance 640. In other scenarios, speaker 502 can request display of a "next" or "previous" image, save the image, and/or communicate the image to another person. Many other scenarios with searches and image displays are possible as well. In other scenarios not shown in FIG. 6, audio and/or video output can be provided with, or instead of, image 650 and/or text 652.

Figure 7:
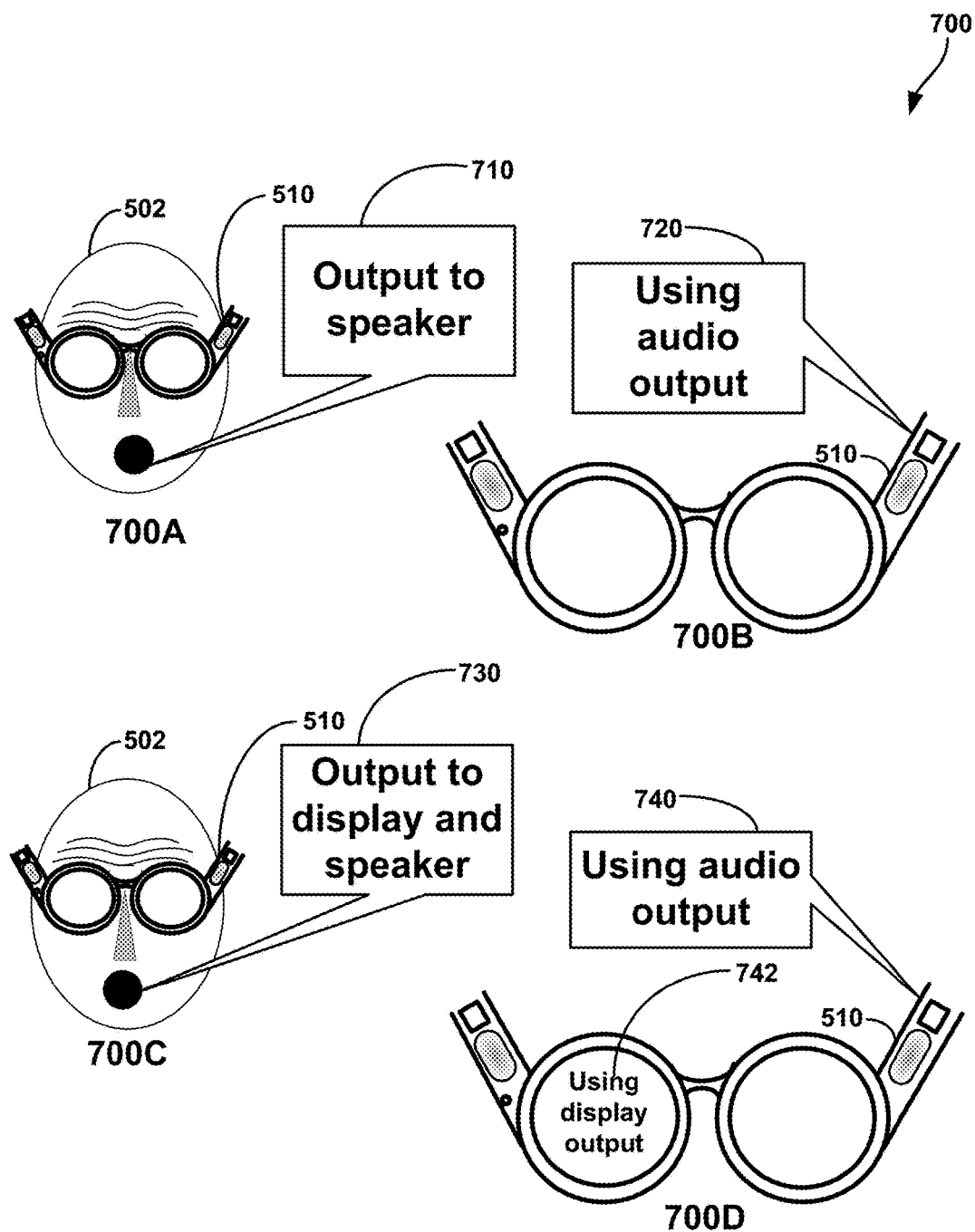
FIG. 7 depicts a third scenario of speech evaluation in accordance with an example embodiment.

FIG. 7 depicts a scenario 700 of speech evaluation in accordance with an example embodiment. Scenario 700 begins at 700A with speaker 502 instructing device 510 using utterance 710 of "Output to speaker."

Upon receiving utterance 710, speech evaluation module 430 of device 510 can determine that the action is "output" and the object is "to speaker" using the techniques discussed above with reference to FIGS. 5B and 5C. Upon determining that the action is "output", speech evaluation module 430 can send a command to direct any future output to the object of the speech input; that is direct output to audio-output device configured for producing audio output (e.g., provide output to an speaker or earphone jack).

FIG. 7 shows that, at 700B, device 510 confirms that utterance 710 has been processed by outputting output 720 of "Using audio output" via an audio-output device.

FIG. 7 also shows that, at 700C, speaker 502 instructs device 510 with utterance 730 of "Output to display and speaker." Upon receiving utterance 730, speech evaluation module 430 of device 510 can determine that the action is "output" and the object is "to display and speaker" using the techniques discussed above with reference to FIGS. 5B and 5C. Upon determining that the action is "output", speech evaluation module 430 can send a command to direct any future output to the object of the speech input to both the audio-output device and to a display, such as one or more lens elements 110, 112, and/or HMD 401.

FIG. 7 shows that, at 700D, device 510 can confirm that utterance 730 has been processed by outputting output 740 of "Using audio output" via an audio-output device and output 742 of "Using display output" on a lens element.

In scenarios not shown in FIG. 7, output can be directed to a display only. In still other scenarios not shown in FIG. 7, output can be stored (e.g., in a file), provided to other output devices of device 510, communicated using a communication link to another computing device and/or a network, and/or provided to other outputs. Also, some of these scenarios, output can be directed to a file for some period of time and later speech input can close the file, ending storage of the output in the file. For example, a first utterance can be speech input to "Copy output to file output1", then all output can be stored in the file "output1", and later speech input, such as "Close output1" can terminate storage of the output to the output1 file. In other scenarios, input devices can be turned on and off via speech input as well; e.g., "Turn on microphone", "Turn off keyboard", etc. Many other scenarios are possible as well.

Figure 8:
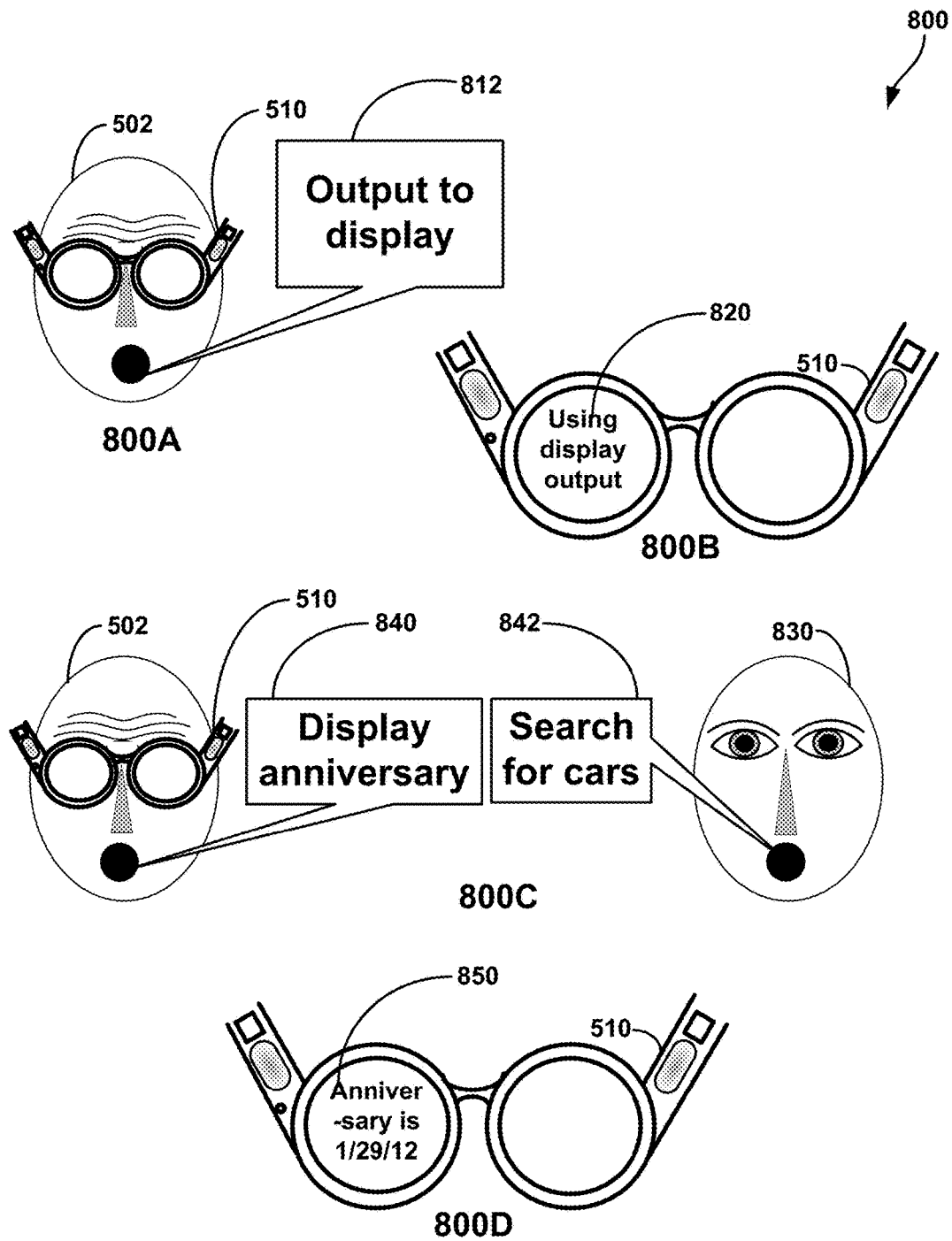
FIG. 8 depicts a fourth scenario of speech evaluation in accordance with an example embodiment.

FIG. 8 depicts a scenario 800 of speech evaluation in accordance with an example embodiment. Scenario 800 begins at 800A with speaker 502 instructing device 510 using utterance 810 of "Output to display." Upon receiving utterance 810, speech evaluation module 430 of device 510 can determine that the action is "output" and the object is "to display" using the techniques discussed above with reference to FIGS. 5B and 5C. FIG. 8 shows that, at 800B, device 510 confirms the output is provided to the display by outputting prompt 820 of "Using display output" on a display of device 510.

At 800C, FIG. 8 shows two speakers—speaker 502 and speaker 830—simultaneously providing speech input to device 510. Speaker 502 provides speech input to device 510 via utterance 840 of "Display anniversary" and speaker 830 provides speech input to device 510 via utterance 842 of "Search for cars."

After receiving the speech inputs at 800C, device 510 can analyze the audio data in which speech is detected to verify that the speech is associated with an authorized user of the system. For example, as discussed above, device 510 can use voiceprints to determine authorized or unauthorized users.

In some embodiments, priority and/or security information can be associated with a voiceprint and/or other speech characteristics that identify a speaker. The priority information can include information that specifies an importance of a speaker; for example, suppose a device 510 has two possible speakers: speaker O that owns device 510, and speaker F that borrows device 510 on occasion. Then, the priority of speaker O can indicate that speaker O has more importance than speaker F. The priority information can be used to determine whose speech input that device 510 processes when multiple authorized speakers provide simultaneous, or near simultaneous speech input. In this example, when speakers O and F both speak, device 510 can use the priority information to process speaker O's speech input.

Security information can be used to enable or disable certain functions of device 510. For example, suppose two levels of security are provided: a guest level of security, which lets a speaker perform searches, display search results, and turn on/off device 510 via speech commands only, and an owner level of security, which lets a speaker perform all actions via speech commands. Continuing the speakers F and O example, speaker F can be assigned the guest level of security, and speaker O can be assigned the user level of security. Many other techniques for priority and/or security are possible as well.

As another example of security information, device 510 can store and/or access one or more stored voiceprints of authorized users. Then, upon receiving speech input, device 510 generate a voiceprint of each speaker identified in the audio data and compare the generated voiceprint(s) with the stored voiceprint(s) of authorized user(s). If a match is found between a stored voiceprint and a generated voiceprint, then the user can be classified as authorized, and device 510 can perform the instruction(s) in the speech input from the authorized user.

In some embodiments, one or more device identifiers can be stored with the voiceprint(s) of authorized user(s). In these embodiments, both voiceprints and device identifiers can be compared before a user can be authorized to use a specific device; e.g., device 510. That is, the device can compare generated and stored voiceprints and a current device identifier with a device identifier stored with the voiceprint. A speaker can then be authorized to use a device associated with the current device identifier when both the voiceprints and the device identifiers match. These embodiments can permit voiceprint storage in location(s) other than on device 510. In some of these embodiments, priority and/or security information can be associated with some or all stored voiceprint(s).

In other embodiments, device 510 does not generate the voiceprint; rather, device 510 can provides voice data and perhaps current device information to another device that generates the voiceprint. The generated voiceprint can be communicated to device 510 and/or compared to stored voiceprint(s) to determine if a speaker is authorized. This can simplify device 510 by permitting generation of voiceprints by devices other than device 510.

In scenario 800 at 800C, speaker 510 is determined to be an authorized speaker and speaker 830 is determined to be an unauthorized speaker. Accordingly, utterance 840 is treated as speech input by device 510 and utterance 842 is ignored by device 510.

Upon determining utterance 840 is authorized speech input, speech evaluation module 430 of device 510 can determine that the action is "display" and the object is "anniversary" using the techniques discussed above with reference to FIGS. 5B and 5C. Device 510 can perform a contextual search (or use other techniques) to determine that the anniversary for speaker 510 is on Jan. 29, 2012. FIG. 8 shows that, at 800D, device 510 can generate prompt 850 indicating that the "Anniversary is 1/29/12."

In other scenarios not shown in FIG. 8, both speakers 510 and 830 can be authorized speakers. In such scenarios, speech inputs from multiple authorized speakers can be processed on a first-come-first-served (FCFS) basis, based on a priority and/or security information associated with a speaker, based on a proximity to device 510, based on a number of previous speech inputs made by the speaker; i.e., the more previous speech inputs processed by device 510 for a given authorized speaker indicates that the given authorized speaker is to be given a higher priority; based on keywords or passwords used by a speaker and/or by other techniques.

In some embodiments, a number of speakers can be determined. For example, at 800C of scenario 800, device 510 can determine voice prints, frequency ranges, and/or other speech-related characteristics differ between utterances 840 and 842. Thus, by identifying a number of differing speech-related characteristics for speech input, a number of speakers of speech input can be determined; e.g., each different set of speech-related characteristics can be assigned to one speaker. Thus, counting the number of different sets of speech-related characteristics can indicate a number of different speakers.

Then, in some scenarios not shown in FIG. 8, outputs can be determined based on the number of speakers. For example, if the number of speakers is one, output can use one format, such as audio output, while another format, such as video, can be used if the number of speakers is greater than one. Such output choices can be stored in preference information 560. Many other techniques and scenarios involving multiple speakers are possible as well.

Figure 9:
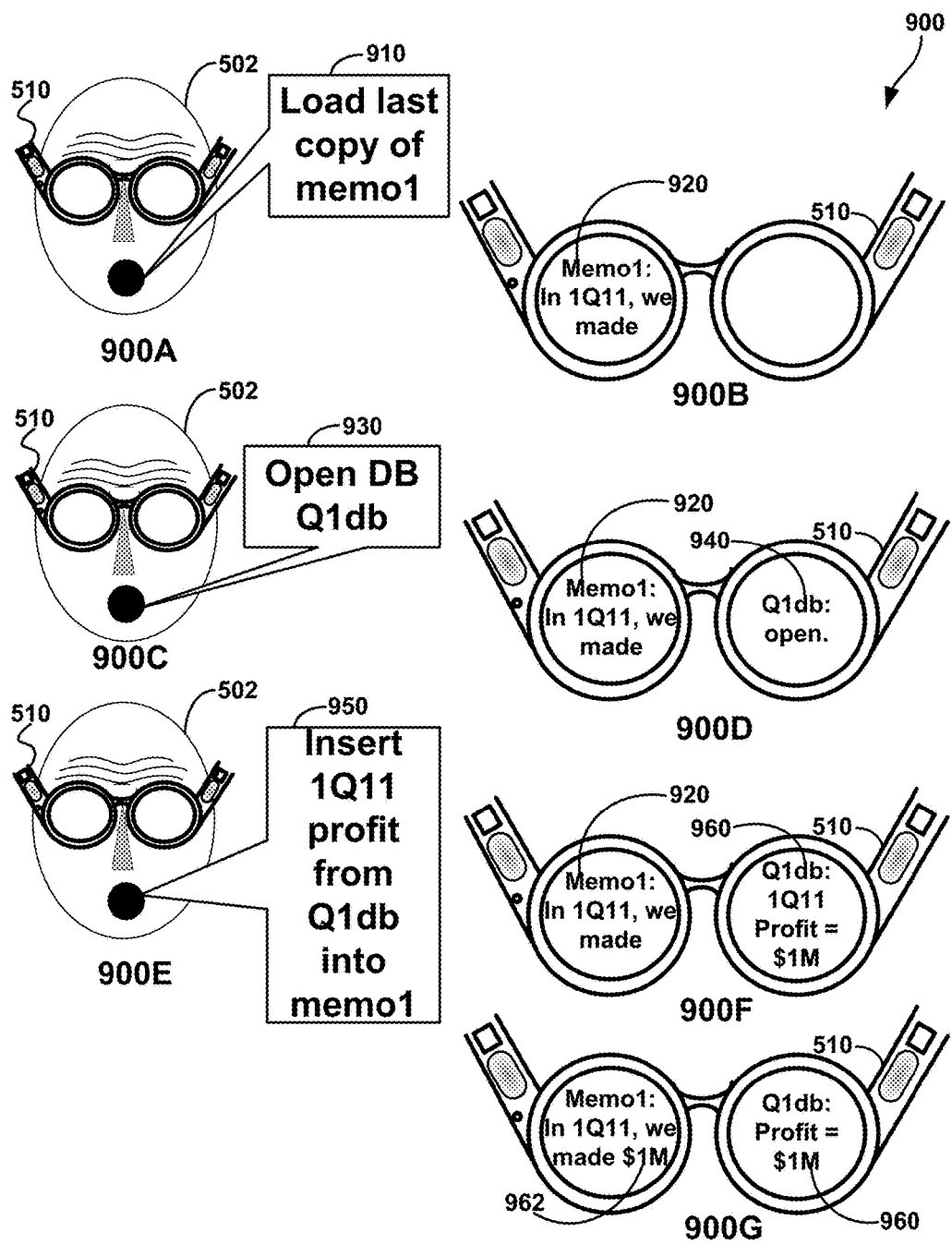
FIG. 9 depicts a fifth scenario of speech evaluation in accordance with an example embodiment.

FIG. 9 depicts a scenario 900 of speech evaluation in accordance with an example embodiment. Scenario 900 begins at 900A with speaker 502 instructing device 510 using utterance 910 of "Load last copy of memo1." Upon receiving utterance 910, speech evaluation module 430 of device 510 can determine that the action is "load" and the object is "last copy of memo1" using the techniques discussed above with reference to FIGS. 5B and 5C. Further, as discussed above with reference to FIGS. 5B and 5C, speech evaluation module 430 can disambiguate the "last copy of memo1" object to refer to a most-recently modified version of a file entitled "memo1." FIG. 9 shows that, at 900B, device 510 displays a first portion of memo1 as output 920 of "Memo1: In 1Q11, we made" on a display of device 510.

FIG. 9 indicates that scenario 900 continues at 900C with speaker 502 instructing device 510 using utterance 930 of "Open DB Q1db." Upon receiving utterance 930, speech evaluation module 430 of device 510 can determine that the action is "open" and the object is "DB Q1db" using the techniques discussed above with reference to FIGS. 5B and 5C. Further, as discussed above with reference to FIGS. 5B and 5C, speech evaluation module 430 can disambiguate the "DB Q1db" object to be a database (DB) entitled "Q1db" and then open the Q1db database.

Upon opening the Q1db database, scenario 900 at 900D shows device 510 providing prompt 940 of "Q1db: open" on a display of device 510 to indicate that the Q1db database has been opened.

FIG. 9 indicates that scenario 900 continues at 900E with speaker 502 instructing device 510 using utterance 950 of "Insert 1Q11 profit from Q1db into memo1." Upon receiving utterance 950, speech evaluation module 430 of device 510 can determine that the action is "insert" and the object is "1Q11 profit from Q1db into memo1" using the techniques discussed above with reference to FIGS. 5B and 5C. Further, as discussed above with reference to FIGS. 5B and 5C, speech evaluation module 430 can disambiguate the "1Q11 profit from Q1db into memo1" object to 1Q11 profit that can be found in the Q1db database and is to be placed in the memo1 file.

In some embodiments, the Q1db database and perhaps other databases are resident; e.g., stored on device 510. In other embodiments, the Q1db database and perhaps other databases are not resident on device 510. In such embodiments, the device 510 can be configured to communicate with Q1db database, regardless of whether the database is or is not resident on the wearable computing device. For example, device 510 can be configured to access databases using a common set of access functions that permit communication with resident database(s) using local communication functionality, non-resident database(s) via a communication link or other communication interface, and both resident and non-resident databases.

In response to utterance 950, device 510 can generate a command to query Q1 db for the 1Q11 profit. FIG. 9 shows that, at 900F of scenario 900, device 510 has received output from the query command that indicates the 1Q11 profit is $1M, and has provided corresponding prompt 960 on a display of device 510.

Then, device 510 can insert the profit value of "$1M" retrieved from the Q1 db database into the memo1 file. FIG. 9 shows that, at 900G of scenario 900, device 510 has generated output 962 of an updated first portion of memo1 that includes the "$1M" from Q1db.

In scenarios not shown in FIG. 9, implicit search requests can be generated for a document. An implicit search request is a request for information generated by editing a document. For example, consider that a document is edited by adding the words "sword fighting." In response, an implicit search request for information about sword fighting can be generated and sent to one or more search engines. Implicit search requests are search requests generated by device 510, or perhaps another device, without specific user interaction (e.g., speech input) to control timing of the communication of the search request to a search engine and/or content of the search request. Information received from search engines based on implicit search requests can be provided to device 510, which can display the information without specific user interaction to control timing and/or content of the displayed information. Continuing the example above, in response to the implicit search request for "sword fighting", information, historical allusions, literature, music, games, etc. related to sword fighting can be provided using device 510.

Many other scenarios involving reviewing, editing, and deleting documents, databases, and/or other files are possible as well.

Example Operation

Figure 10:
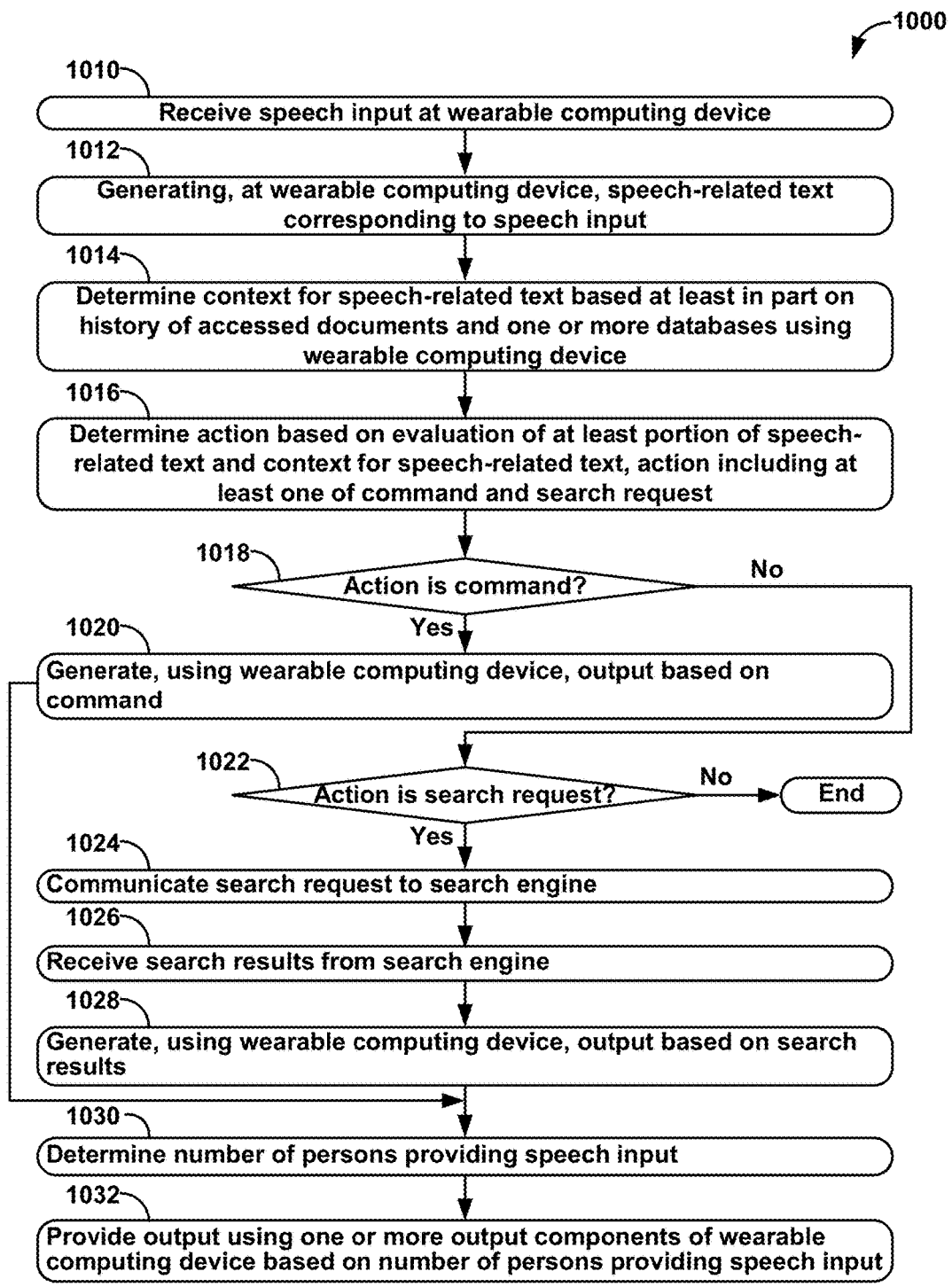
FIG. 10 is a flow chart of a method in accordance with an example embodiment.

FIG. 10 is a flow chart of an example method 1000 in accordance with an example embodiment. At block 1010, speech input can be received at a wearable computing device. Receiving speech input at wearable computing devices is described above with reference to at least FIGS. 4-9.

At block 1012, speech-related text corresponding to the speech input can be generated at the wearable computing device. Generating speech-related text corresponding to speech input is discussed above in more detail with reference to at least FIGS. 4-5C.

At block 1014, a context for the speech-related text can be determined using the wearable computing device. The context can based at least in part on a history of accessed documents and one or more databases. Determining contexts for speech-related text is discussed above is discussed above in more detail with reference to at least FIGS. 4-5C.

In some embodiments, at least one database of the one or more databases is not resident on the wearable computing device. In these embodiments, the wearable computing device can be configured to communicate with the at least one database that is not resident on the wearable computing device. Resident and non-resident databases are discussed above in more detail at least with reference to FIG. 9.

At block 1016, an action is determined, based on an evaluation of at least a portion of the speech-related text and the context for the speech-related text. The action can include at least one of a command and a search request. Determining actions based on evaluating contexts and speech-related text is discussed above in more detail at least with reference to FIGS. 5-9.

At block 1018, a determination is made as to whether the action is a command. If the action is a command, method 1000 proceeds to block 1020. If the action is not a command, method 1000 proceeds to block 1022.

At block 1020, as the action is a command, the wearable computing device can generate output based on the command. Generating output based on commands is discussed above in more detail with reference to at least FIGS. 5-9.

In some embodiments, the command can be selected from the group of a communication command, a scheduling command, a command to display information, a command to save information, and a command to delete information. In other embodiments, the command can be an implicit search request, and wherein the implicit search request comprises a request to search within the context. Commands and actions are discussed above in greater detail with reference to at least FIGS. 5-9.

Upon completing block 1020, method 1000 proceeds to block 1030.

At block 1022, a determination is made as to whether the action is a search request. If the action is a search request, method 1000 proceeds to block 1024. If the action is not a search request, method 1000 ends.

At block 1024, as the action includes a search request, the search request can be communicated to a search engine. Communicating search requests to search engines is discussed above in more detail at least with reference to FIGS. 6 and 9.

At block 1026, search results are received from the search engine. Receiving search results from search engines is discussed above in more detail at least with reference to FIGS. 6 and 9.

At block 1028, output is generated based on the search results using the wearable computing device. Generating output based on search results is discussed above in more detail at least with reference to FIGS. 6 and 9.

At block 1030, a number of persons providing speech input is determined. Determining the number of persons providing speech input is discussed above in more detail at least with reference to FIG. 8.

At block 1032, the output is provided using one or more output components of the wearable computing device based on the number of persons providing speech input. In some embodiments, the one or more output components can include an audio output and/or a video output. Audio and video outputs are discussed above in more detail at least with reference to FIGS. 4-9.

In some embodiments, method 1000 includes determining a number of persons providing speech input based on determining a number of different sets of speech-related characteristics. Determining the number of different sets of speech-related characteristics is discussed above in more detail at least with reference to FIG. 8.

In other embodiments, a user can be associated with the speech input. Then, providing the output comprises providing the output based on the determined user. In particular of these other embodiments, an output preference of the determined user can be stored; e.g., output to speakers only; output to both speakers and display; output to speakers when number of speakers=1, otherwise output to display; speaker volume, display brightness, display font. Then, providing the output based on the determined user can include providing the output based on the stored output preference for the determined user. Providing user-controlled output, such as indicated by speech input and perhaps as part of preference information, is discussed above with reference to at least FIGS. 5-9.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving, by a wearable computing device, input data from one or more input source devices;
   determining that the received input data includes both a first data pattern representing an explicit command and a second data pattern representing an implicit search request, wherein the first data pattern representing the explicit command comprises the first data pattern indicating that the wearable computing device should carry out a particular operation, and wherein the second data pattern representing the implicit search request comprises the second data pattern indicating that the wearable computing device should provide search results based on particular content even though the input data is without an explicit indication to provide the search results based on the particular content; and in response to determining that the received input data includes both the first data pattern representing the explicit command and the second data pattern representing the implicit search request, the wearable computing device prioritizing the explicit command over the implicit search request by carrying out the particular operation.

2. The method of claim 1, wherein the explicit command is a command selected from the group of a communication command, a scheduling command, a command to display information, a command to save information, and a command to delete information.

3. The method of claim 1, further comprising:
determining, by the wearable computing device, a context associated with the wearable computing device,
wherein one or more of the particular content and the particular operation is based at least in part on the determined context.

4. The method of claim 1, wherein the wearable computing device comprises one or more output components, wherein the one or more output components comprise an audio output and/or a video output, and wherein the wearable computing device provides, via at least one of the output components, one or more of an output based on the search results and an output based on the particular operation.

5. The method of claim 1, wherein the wearable computing device is configured to carry out the particular operation by communicating with at least one database that is not resident on the wearable computing device.

6. The method of claim 1, wherein the input data comprises speech data.

7. The method of claim 1, further comprising:
determining a user associated with the input data,
wherein the wearable computing device prioritizing the explicit command over the implicit search request is based on the determined user.

8. The method of claim 7, further comprising:
storing an output preference of the determined user,
wherein prioritizing the explicit command over the implicit search request based on the determined user comprises prioritizing the explicit command over the implicit search request based on the stored output preference for the determined user.

9. A wearable computing device comprising:
means for receiving input data from one or more input source means;
means for determining that the received input data includes both a first data pattern representing an explicit command and a second data pattern representing an implicit search request, wherein the first data pattern representing the explicit command comprises the first data pattern indicating that the wearable computing device should carry out a particular operation, and wherein the second data pattern representing the implicit search request comprises the second data pattern indicating that the wearable computing device should provide search results based on particular content even though the input data is without an explicit indication to provide the search results based on the particular content; and means for, in response to determining that the received input data includes both the first data pattern representing the explicit command and the second data pattern representing the implicit search request, prioritizing the explicit command over the implicit search request by carrying out the particular operation.

10. The wearable computing device of claim 9, further comprising:
means for determining a context associated with the wearable computing device,
wherein one or more of the particular content and the particular operation is based at least in part on the determined context.

11. The wearable computing device of claim 9, further comprising means to carry out the particular operation by communicating with at least one database that is not resident on the wearable computing device.

12. The wearable computing device of claim 9, wherein the input data comprises speech data.

13. The wearable computing device of claim 9, further comprising:
means for determining a user associated with the input data,
wherein prioritizing the explicit command over the implicit search request is based on the determined user.

14. The wearable computing device of claim 13, further comprising:
means for storing an output preference of the determined user,
wherein prioritizing the explicit command over the implicit search request based on the determined user comprises the prioritizing the explicit command over the implicit search request based on the stored output preference for the determined user.

15. An article of manufacture including a tangible non-transitory computer-readable storage medium having computer-readable instructions encoded thereon, the instructions comprising:
instructions for receiving input data from one or more input source devices;
instructions for determining that the received input data includes both a first data pattern representing an explicit command and a second data pattern representing an implicit search request, wherein the first data pattern representing the explicit command comprises the first data pattern indicating that the wearable computing device should carry out a particular operation, and wherein the second data pattern representing the implicit search request comprises the second data pattern indicating that the wearable computing device should provide search results based on particular content even though the input data is without an explicit indication to provide the search results based on the particular content; and
instructions for, in response to determining that the received input data includes both the first data pattern representing the explicit command and the second data pattern representing the implicit search request, the wearable computing device prioritizing the explicit command over the implicit search request by carrying out the particular operation.

16. The article of manufacture of claim 15, the instructions further comprising:

instructions for determining a context associated with the wearable computing device,
wherein one or more of the particular content and the particular operation is based at least in part on the determined context.

17. The article of manufacture of claim 15, the instructions further comprising:
instructions to carry out the particular operation by communicating with at least one database that is not resident on the wearable computing device.

18. The article of manufacture of claim 15, wherein the input data comprises speech data.

19. The article of manufacture of claim 15, the instructions further comprising:
instructions for determining a user associated with the input data,
wherein prioritizing the explicit command over the implicit search request is based on the determined user.

20. The article of manufacture of claim 19, further comprising:
instructions for storing an output preference of the determined user,
wherein prioritizing the explicit command over the implicit search request based on the determined user comprises prioritizing the explicit command over the implicit search request based on the stored output preference for the determined user.

* * * * *